US009015174B2

(12) United States Patent
Duan et al.

(10) Patent No.: US 9,015,174 B2
(45) Date of Patent: Apr. 21, 2015

(54) LIKEFARM DETERMINATION

(75) Inventors: Lei Duan, San Jose, CA (US); Will Chin, Sunnyvale, CA (US); Seokkyung Chung, San Jose, CA (US); Lei Guo, Milpitas, CA (US); Guenther Schmuelling, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 13/329,204

(22) Filed: Dec. 16, 2011

(65) Prior Publication Data
US 2013/0159319 A1  Jun. 20, 2013

(51) Int. Cl.
*G06F 17/30* (2006.01)
(52) U.S. Cl.
CPC ............................... *G06F 17/30873* (2013.01)
(58) Field of Classification Search
CPC .................................................. G06F 17/30873
USPC .................. 707/749, 748, 733, E17.109, 751
See application file for complete search history.

(56) References Cited

U.S. PATENT DOCUMENTS

| | | | | |
|---|---|---|---|---|
| 6,795,819 | B2 * | 9/2004 | Wheeler et al. | 707/691 |
| 7,337,458 | B2 * | 2/2008 | Michelitsch et al. | 725/46 |
| 7,769,763 | B1 * | 8/2010 | Bem et al. | 707/749 |
| 7,958,119 | B2 * | 6/2011 | Eggink et al. | 707/732 |
| 8,255,386 | B1 * | 8/2012 | Annau et al. | 707/711 |
| 2008/0028463 | A1 | 1/2008 | Dagon et al. | |
| 2009/0077617 | A1 | 3/2009 | Levow et al. | |
| 2010/0070372 | A1 | 3/2010 | Watfa et al. | |
| 2010/0268661 | A1 * | 10/2010 | Levy et al. | 705/347 |
| 2011/0047168 | A1 * | 2/2011 | Ellingsworth | 707/749 |

OTHER PUBLICATIONS

Mehta, et al., "Unsupervised strategies for shilling detection and robust collaborative filtering", Retrieved Jul. 8, 2011 at <<http://www.l3s.de/web/upload/documents/1/fulltext.pdf>>, Journal User Modeling and User-Adapted Interaction archive, vol. 19, Issue 1, Jul. 18, 2008, pp. 65-97.

Lee, et al., "Uncovering Social Spammers: Social Honeypots +Machine Learning", Retrieved Jul. 8, 2011 at <<http://faculty.cs.tamu.edu/caverlee/pubs/lee10sigir.pdf>>, Proceeding of the 33rd international ACM SIGIR conference on Research and development in information retrieval (SIGIR), Jul. 19-23, 2010, pp. 435-442.

(Continued)

*Primary Examiner* — Robert Beausoliel, Jr.
*Assistant Examiner* — Nirav K Khakhar
(74) *Attorney, Agent, or Firm* — Dave Ream; Jim Ross; Micky Minhas

(57) ABSTRACT

A plurality of web documents that include indicators corresponding to one or more selectable like objects may be obtained. A corresponding web domain associated with each of the plurality of obtained web documents may be determined. A domain total like object count of the indicators corresponding to the one or more selectable like objects may be determined for each one of the obtained plurality of web documents, for each determined corresponding web domain. A candidate group of the corresponding web domains may be determined based on a comparison of a predetermined first threshold value with one or more of the domain total like object counts. A likefarm domain confidence score may be determined for each one of a second group of the corresponding web domains based on a decision tree function that is based on a plurality of domain attributes.

20 Claims, 11 Drawing Sheets

(56) References Cited

OTHER PUBLICATIONS

Metaxas, et al., "Web Spam, Propaganda and Trust", Retrieved Jul. 8, 2011 at >>http://airweb.cse.lehigh.edu/2005/metaxas.pdf>>, First International Workshop on Adversarial Information Retrieval on the Web, co-located with the WWW conference, May 10, 2005, pp. 70-78.

Hameed, et al., "LENS: Leveraging social Networking and trust to prevent Spam transmission", Retrieved Jul. 8, 2011 at <<http://user.informatik.uni-goettingen.de/~shameed/lens/docs/LENS-ISSN%201611-1044.pdf>>, Technical Report No. IFI-TB-2011-02, Institute of Computer Science, ISSN 1611-1044, Feb. 16, 2011, pp. 1-31.

He, et al., "Asymmetric Gradient Boosting with Application to Spam Filtering", Retrieved Jul. 8, 2011 at <<http://research.microsoft.com/pubs/69455/dc_boosting.pdf>>, Fourth Conference on Email and Anti-Spam CEAS, Aug. 2-3, 2007, pp. 1-8.

Saint, Nick, "Facebook "Like Farms" Are Spamming Up Your News Feed", Retrieved Jul. 8, 2011 at <<http://www.businessinsider.com/facebook-like-buttons-spawn-a-new-form-of-spam>>, Aug. 2010, 2 pages.

O'Neill, Nick, "The Rise of the Like Farm", Retrieved Jul. 8, 2011 at <<http://www.allfacebook.com/like-farm>>, Jun. 2010, 11 pages.

Forrester, Duane, "Link farms and Like farms—Don't Be Tempted", Retrieved Nov. 27, 2011 at <<http://www.bing.com/community/site_blogs/b/webmaster/archive/2011/08/31/link-farms-and-like-farms-don-t-be-tempted.aspx>>, Aug. 31, 2011, 3 pages.

* cited by examiner

200b (2A)

216 — The plurality of domain attributes includes one or more of a likefarm classification value indicating an average value over the obtained like documents associated with the each corresponding web domain, a length of time of domain registration associated with each corresponding web domain included in the first candidate group, a total count of like selection objects associated with respective home pages that are associated with each corresponding web domain included in the first candidate group, an indication that a web location associated with the each corresponding web domain included in the first candidate group is included in a list of likefarm blacklist web locations, or an indication that data associated with one or more web pages associated with the each corresponding web domain included in the first candidate group is included in a likefarm blacklist associated with one or more web services 218 — The second group includes the respective corresponding web domains associated with each of the plurality of obtained like documents or the first candidate group

FIG. 2b

LIKEFARM DETERMINATION

BACKGROUND

Users of electronic devices are increasingly relying on information obtained from web searches as sources of news reports, ratings, item descriptions, announcements, event information, and other various types of information that may be of interest to the users. Further, users are increasingly relying on search results as part of their work in various tasks. For example, a user planning a trip may rely on search results relating to fights, hotels, car rentals, and restaurants. Search results may be provided to the users in an ordering that may be based on ranking scores, which may be determined based on a number of various attributes. For example, many web services may provide a "like" functionality wherein users may provide subjective input with regard to the user's "like" or "dislike" of particular subject matter referenced, for example, via a selectable like object such as a like button icon displayed on a display area. Thus, system users may generate higher ranking values associated with display of search results, based on a large number of "likes" associated with their web pages.

Thus, a "likefarm" web page may include information displayed by a servicing user, in hopes that other users may be induced to activate "like" buttons that reference the servicing user's web page(s), so that a number of "likes" associated with the servicing user's web page(s) may incrementally reach a very large number, in a short period of time.

SUMMARY

According to one general aspect, a system may include a like document acquisition component that obtains a plurality of like documents that include indicators corresponding to one or more like selection objects. The system may also include a document like total component that determines a document total like count of the indicators corresponding to the one or more like selection objects for each one of the plurality of like documents. The system may also include a domain determination component that determines a corresponding web domain associated with each of the plurality of obtained like documents. The system may also include a domain like total component that determines a domain total like count corresponding to a sum of the document total like counts of the indicators for each corresponding web domain associated with each of the plurality of obtained like documents. The system may also include a first candidate selection component that determines a first candidate group of the corresponding web domains based on a comparison of a predetermined threshold value with one or more of the domain total like counts. The system may also include a likefarm domain confidence determination component that determines, via a device processor, a likefarm domain confidence score for each one of a second group of the corresponding web domains based on a decision tree function that is based on a plurality of domain attributes.

According to another aspect, a computer program product tangibly embodied on a computer-readable storage medium may include executable code that may cause at least one data processing apparatus to obtain a plurality of like documents that include indicators corresponding to one or more like selection entities. Further, the at least one data processing apparatus may determine a corresponding web domain associated with each of the plurality of obtained like documents. Further, the at least one data processing apparatus may determine a domain total like count of the indicators corresponding to the one or more like selection entities for each one of the obtained plurality of like documents, for each determined corresponding web domain. Further, the at least one data processing apparatus may determine a first candidate group of the corresponding web domains based on a comparison of a predetermined threshold value with one or more of the domain total like counts. Further, the at least one data processing apparatus may determine a likefarm domain confidence score for each one of a second group of the corresponding web domains based on a decision tree function that is based on a plurality of domain attributes.

According to another aspect, a plurality of web documents that include indicators corresponding to one or more selectable like objects may be obtained. A corresponding web domain associated with each of the plurality of obtained web documents may be determined. A domain total like object count of the indicators corresponding to the one or more selectable like objects may be determined for each one of the obtained plurality of web documents, for each determined corresponding web domain. A first candidate group of the corresponding web domains may be determined based on a comparison of a predetermined first threshold value with one or more of the domain total like object counts. A likefarm domain confidence score may be determined for each one of a second group of the corresponding web domains based on a decision tree function that is based on a plurality of domain attributes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Many web services may provide a "like" functionality wherein users may provide subjective input with regard to the user's "like" or "dislike" of particular subject matter referenced, for example, via a selectable like object such as a like button icon displayed on a display area. Thus, system users may generate higher ranking values associated with display of search results, based on a large number of "likes" associated with their web pages.

In this context, a "likefarm" may refer to a service that may be configured to obtain a large number of likes associated with content that is associated with users of the service. For example, a likefarm web page may include humorous pictures or jokes that may be accompanied by selectable like button icons that may be configured to generate counts of "likes" for association with a service user's content. Thus, a browsing user may activate the selectable like button icons, based on their subjective "like" of the displayed humorous material, not realizing that they are adding to the "like" count of the service user's content.

For example, likefarm sites may include spam sites that may be generated (e.g., by unscrupulous FACEBOOK users) to target other users. For example, a likefarm web page may include displayed quotes or jokes associated with FACEBOOK like buttons for activation (e.g., via a click) by other users. For example, many likefarm pages may include a large amount of advertising. For example, a FACEBOOK user's news feed may become clogged by such likefarms if the FACEBOOK user's friends accidently "liked" a likefarm. For example, if a FACEBOOK user clicked one of the links on his/her news feed, the user may be directed to the actual likefarm site. Thus, the like count associated with a likefarm site may be manipulated to a very large number. Thus, the actual popularity of a liked web site may be compromised by surging popularity rankings associated with such unscrupulous manipulations associated with likefarms.

According to example embodiments discussed herein, web domains associated with likefarm entities may be determined. According to example embodiments discussed herein, the determined web domains associated with likefarm entities may be blacklisted, to aid in avoidance of providing the likefarm entities as highly ranked entities in search results, the rankings based at least in part on "like" counts (e.g., to avoid "spamming" other users).

In this context, a "domain" may refer to a character string that may identify an entity associated with web content. For example, a domain may be established in accordance with techniques associated with a Domain Name System (DNS). For example, a domain name may be registered with a DNS, and may be associated with an Internet Protocol (IP) address, to accommodate web navigation of the associated web content.

Figure 1:
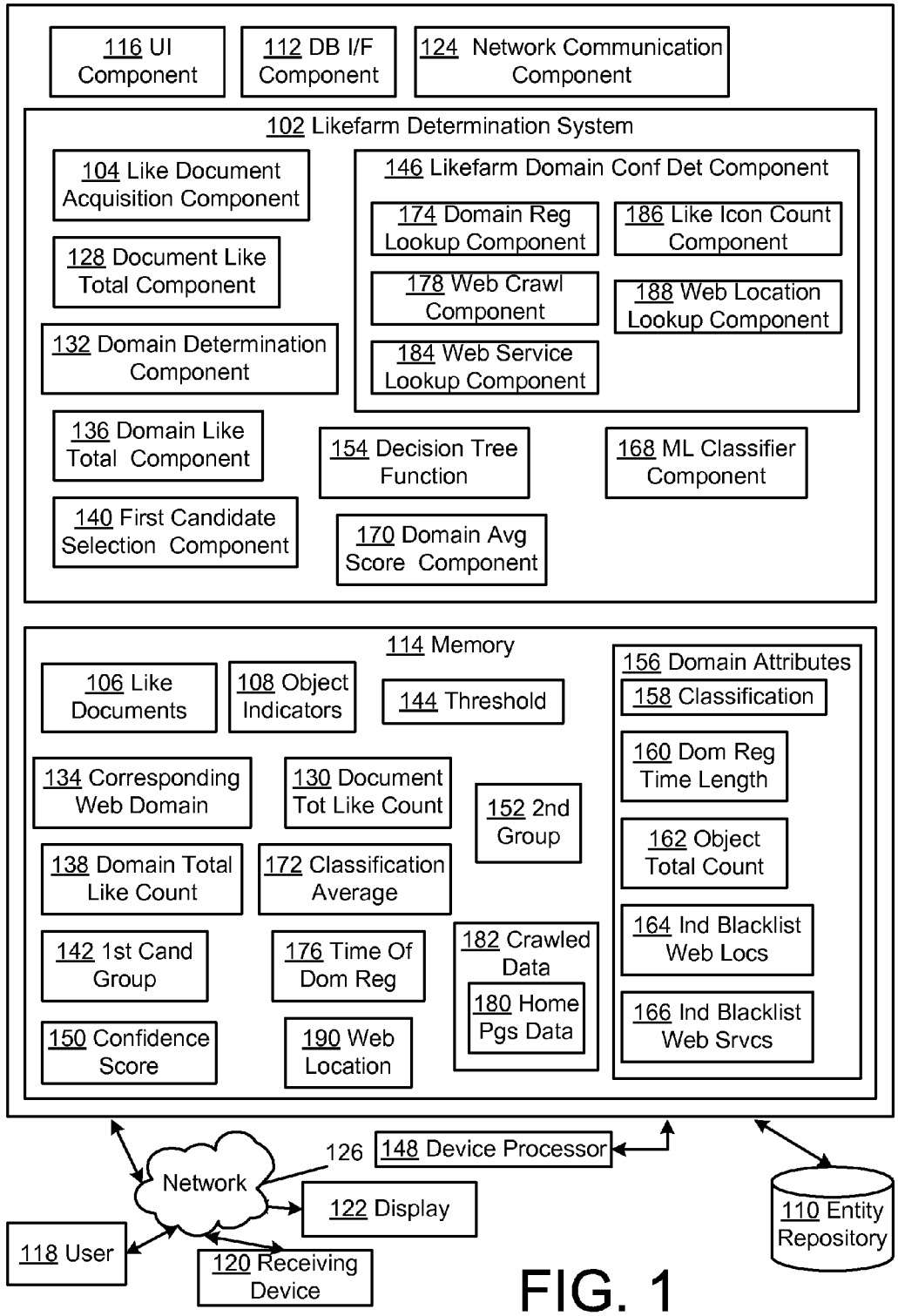
FIG. 1 is a block diagram of an example system for likefarm determination.
Figure 2A:
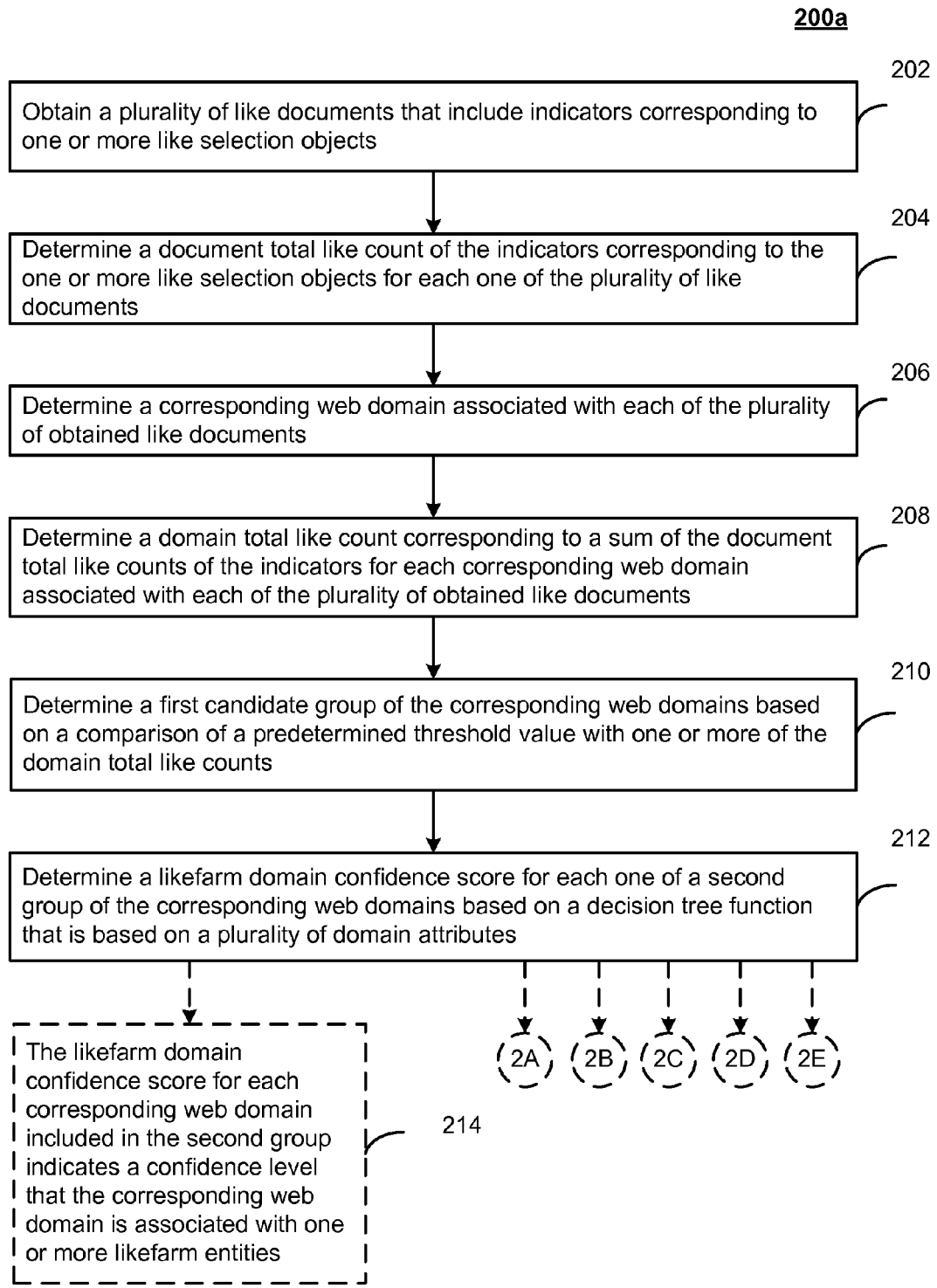
FIG. 2 is a flowchart illustrating example operations of the system of FIG. 1.
Figure 2C:
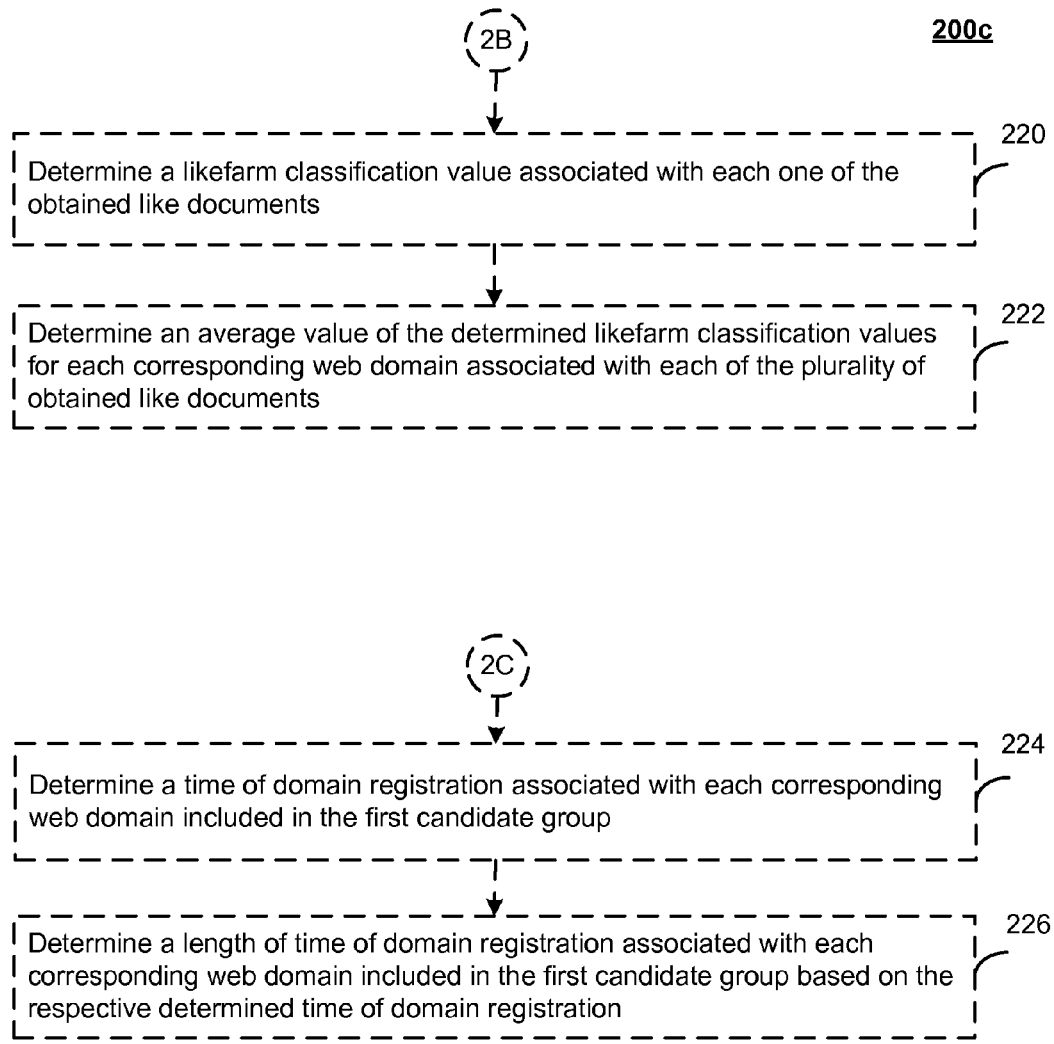
Figure 2D:
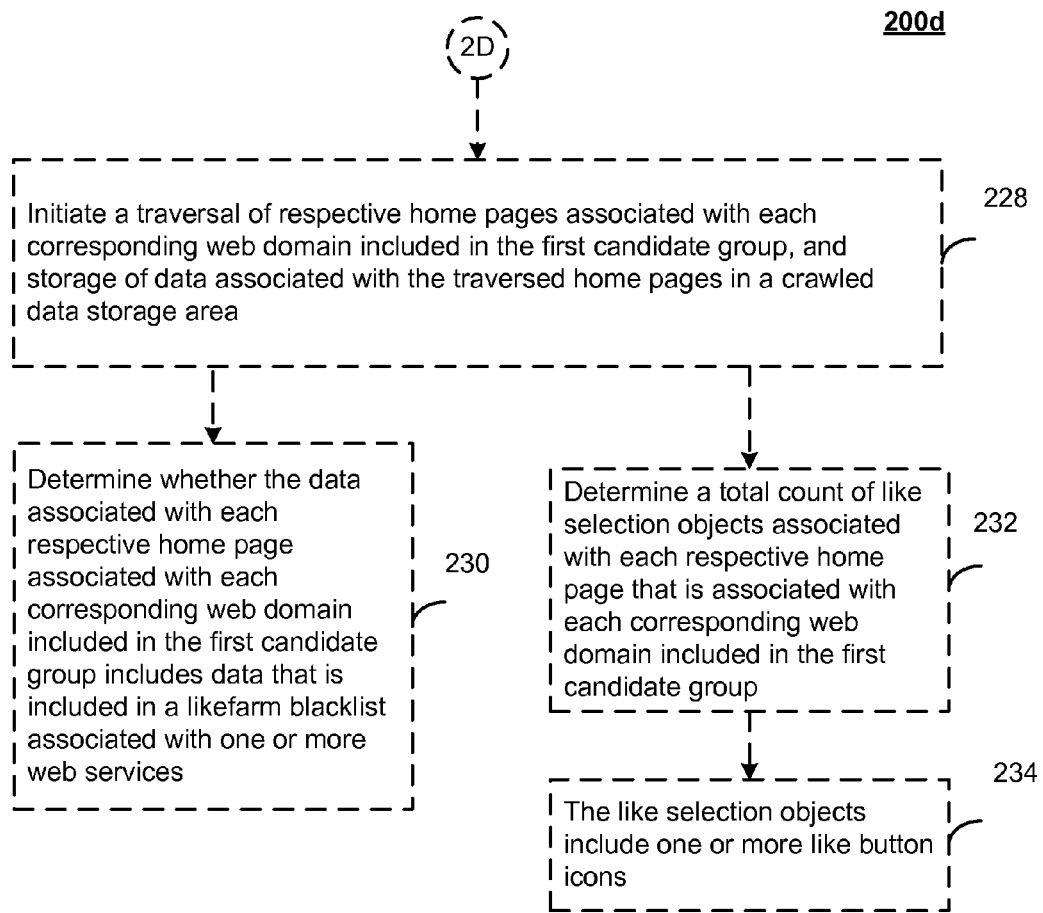
Figure 2E:
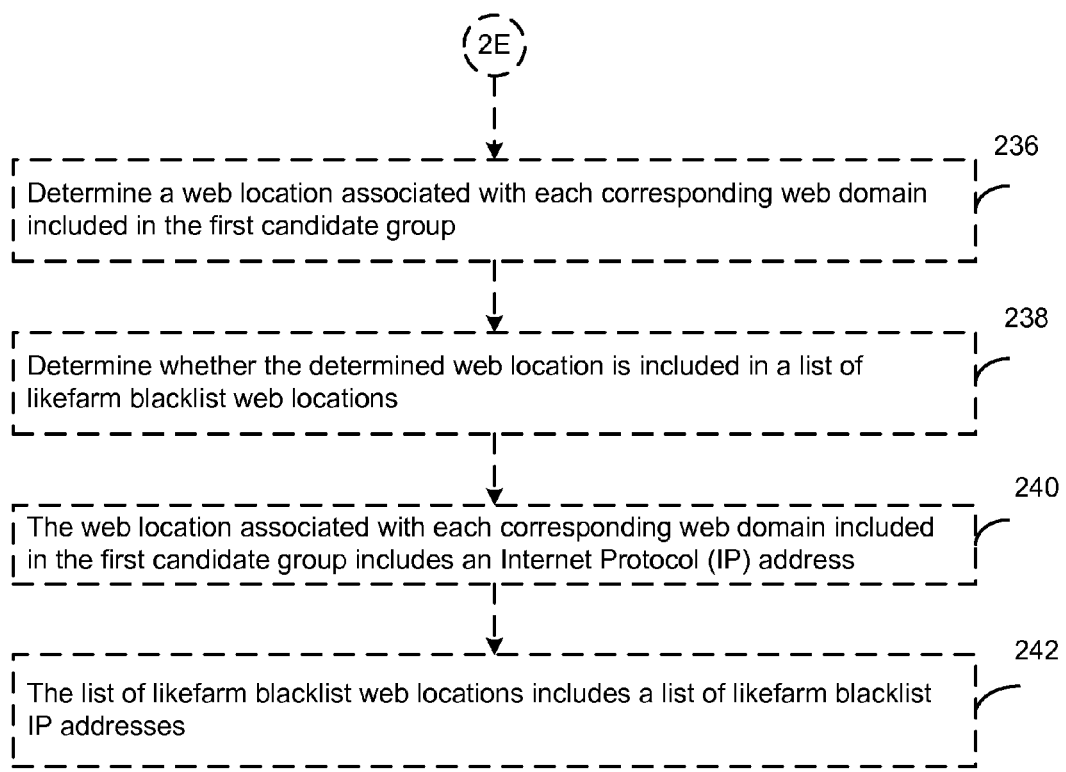

As further discussed herein, FIG. 1 is a block diagram of a system 100 for likefarm determination. As shown in FIG. 1, a system 100 may include a likefarm determination system 102 that includes a like document acquisition component 104 that may obtain a plurality of like documents 106 that include indicators 108 corresponding to one or more like selection objects. For example, the indicators 108 may include selectable like icons or selectable like buttons indicating a user's subjective "like" of subject matter indicated via the selectable like icons or selectable like buttons.

According to an example embodiment, the likefarm determination system 102 may include executable instructions that may be stored on a computer-readable storage medium, as discussed below. According to an example embodiment, the computer-readable storage medium may include any number of storage devices, and any number of storage media types, including distributed devices.

For example, an entity repository 110 may include one or more databases, and may be accessed via a database interface component 112. One skilled in the art of data processing will appreciate that there are many techniques for storing repository information discussed herein, such as various types of database configurations (e.g., SQL SERVERS) and non-database configurations.

According to an example embodiment, the likefarm determination system 102 may include a memory 114 that may store the plurality of like documents 106. In this context, a "memory" may include a single memory device or multiple memory devices configured to store data and/or instructions. Further, the memory 114 may span multiple distributed storage devices.

According to an example embodiment, a user interface component 116 may manage communications between a user 118 and the likefarm determination system 102. The user 118 may be associated with a receiving device 120 that may be associated with a display 122 and other input/output devices. For example, the display 122 may be configured to communicate with the receiving device 120, via internal device bus communications, or via at least one network connection.

According to an example embodiment, the likefarm determination system 102 may include a network communication component 124 that may manage network communication between the likefarm determination system 102 and other entities that may communicate with the likefarm determination system 102 via at least one network 126. For example, the at least one network 126 may include at least one of the Internet, at least one wireless network, or at least one wired network. For example, the at least one network 126 may include a cellular network, a radio network, or any type of network that may support transmission of data for the likefarm determination system 102. For example, the network communication component 124 may manage network communications between the likefarm determination system 102 and the receiving device 120. For example, the network communication component 124 may manage network communication between the user interface component 116 and the receiving device 120.

A document like total component 128 may determine a document total like count 130 of the indicators 108 corresponding to the one or more like selection objects for each one of the plurality of like documents 106. For example, the selectable like icons or selectable like buttons may be tallied, to determine the document total like count 130 for association with each one of the plurality of like documents 106.

A domain determination component 132 may determine a corresponding web domain 134 associated with each of the plurality of obtained like documents 106.

A domain like total component 136 may determine a domain total like count 138 corresponding to a sum of the document total like counts of the indicators 108 for each corresponding web domain 134 associated with each of the plurality of obtained like documents 106.

A first candidate selection component 140 may determine a first candidate group 142 of the corresponding web domains 134 based on a comparison of a predetermined threshold value 144 with one or more of the domain total like counts 138, as discussed further below.

A likefarm domain confidence determination component 146 may determine, via a device processor 148, a likefarm domain confidence score 150 for each one of a second group 152 of the corresponding web domains 134 based on a decision tree function 154 that is based on a plurality of domain attributes 156, as discussed further below.

In this context, a "decision tree" may refer to a decision support technique that may use a tree-like graph or model of decisions and their possible consequences, including chance event outcomes, resource costs, and utility. For example, a decision tree may be used to aid in identifying a strategy most likely to reach a goal. As another example, a decision tree may be used as a descriptive technique for calculating conditional probabilities.

In this context, a "processor" may include a single processor or multiple processors configured to process instructions associated with a processing system. A processor may thus include multiple processors processing instructions in parallel and/or in a distributed manner. Although the device processor 148 is depicted as external to the likefarm determination system 102 in FIG. 1, one skilled in the art of data processing will appreciate that the device processor 148 may be implemented as a single component, and/or as distributed units which may be located internally or externally to the likefarm determination system 102, and/or any of its elements.

According to an example embodiment, the likefarm determination system 102 may communicate directly (not shown in FIG. 1) with the receiving device 120, instead of via the network 126, as depicted in FIG. 1. For example, the likefarm determination system 102 may reside on one or more backend servers, or on a desktop device, or on a mobile device. For example, although not shown in FIG. 1, the user 118 may interact directly with the receiving device 120, which may host at least a portion of the likefarm determination system 102, at least a portion of the device processor 148, and the display 122. According to example embodiments, portions of the system 100 may operate as distributed modules on multiple devices, or may communicate with other portions via one or more networks or connections, or may be hosted on a single device.

According to an example embodiment, the likefarm domain confidence score 150 for each corresponding web domain 134 included in the second group 152 may indicate a confidence level that the corresponding web domain is associated with one or more likefarm entities, as discussed further below.

According to an example embodiment, the plurality of domain attributes 156 may include one or more of a likefarm classification value 158 indicating an average value over the obtained like documents 106 associated with the each corresponding web domain 134, a length of time of domain registration 160 associated with each corresponding web domain 134 included in the first candidate group 142, a total count 162 of like selection objects associated with respective home pages that are associated with each corresponding web domain 134 included in the first candidate group 142, an indication that a web location associated with the each corresponding web domain included in the first candidate group is included in a list of likefarm blacklist web locations 164, or an indication that data associated with one or more web pages associated with the each corresponding web domain included in the first candidate group is included in a likefarm blacklist associated with one or more web services 166, as discussed further below.

According to an example embodiment, the second group 152 may include the respective corresponding web domains 134 associated with each of the plurality of obtained like documents 106 or the first candidate group 142.

According to an example embodiment, a machine learning (ML) classifier component 168 may determine a likefarm classification value 158 associated with each one of the obtained like documents 106. For example, the ML classifier component 168 may generate a score in [0,1]. For example, the ML classifier component 168 may include a logistic regression model that may be trained based on approximately twenty features with 20K documents. For example, if one of the like documents 106 is associated with a score less than 0.5, it may be not considered as a likefarm candidate. For example, the ML classifier component 168 may include a Fisher classifier.

According to an example embodiment, a domain average score component 170 may determine an average value 172 of the determined likefarm classification values for each corresponding web domain 134 associated with each of the plurality of obtained like documents 106.

According to an example embodiment, the likefarm domain confidence determination component 146 may include a domain registration lookup component 174 that may determine a time of domain registration 176 associated with each corresponding web domain 134 included in the first candidate group 142, as discussed further below.

According to an example embodiment, the likefarm domain confidence determination component 146 may determine a length of time of domain registration 160 associated with each corresponding web domain 134 included in the first candidate group 142 based on the respective determined time of domain registration 176.

According to an example embodiment, the likefarm domain confidence determination component 146 may include a web crawl component 178 that may initiate a traversal of respective home pages associated with each corresponding web domain 134 included in the first candidate group 142, and storage of data associated with the traversed home pages 180 in a crawled data storage area 182, as discussed further below. As used in this context, a "traversal" of web pages may refer to crawling page content associated with the webpages, and storing the crawled content.

According to an example embodiment, the likefarm domain confidence determination component 146 may include a web service lookup component 184 that may determine whether the data associated with each respective home page 180 associated with each corresponding web domain 134 included in the first candidate group 142 includes data that is included in a likefarm blacklist associated with one or more web services, as discussed further below.

According to an example embodiment, the likefarm domain confidence determination component 146 may include a like icon count component 186 that may determine a total count 162 of like selection objects associated with each respective home page that is associated with each corresponding web domain 134 included in the first candidate group 142.

According to an example embodiment, the like selection objects may include one or more like button icons.

According to an example embodiment, the likefarm domain confidence determination component 146 may include a web location lookup component 188 that may determine a web location 190 associated with each corresponding web domain 134 included in the first candidate group 142, as discussed further below.

According to an example embodiment, the likefarm domain confidence determination component 146 may determine whether the determined web location 190 is included in a list of likefarm blacklist web locations.

According to an example embodiment, the web location 190 associated with each corresponding web domain 134 included in the first candidate group 142 may include an Internet Protocol (IP) address.

According to an example embodiment, the list of likefarm blacklist web locations may include a list of likefarm blacklist IP addresses.

FIG. 2 is a flowchart illustrating example operations of the system of FIG. 1, according to example embodiments. In the example of FIG. 2a, a plurality of like documents that include indicators corresponding to one or more like selection objects may be obtained (202). For example, the like document acquisition component 104 may obtain the plurality of like documents 106 that include indicators 108 corresponding to one or more like selection objects, as discussed above.

A document total like count of the indicators corresponding to the one or more like selection objects may be determined for each one of the plurality of like documents (204). For example, the document like total component 128 may determine a document total like count 130 of the indicators 108 corresponding to the one or more like selection objects for each one of the plurality of like documents, as discussed above.

A corresponding web domain associated with each of the plurality of obtained like documents may be determined (206). For example, the domain determination component 132 may determine a corresponding web domain 134 associated with each of the plurality of obtained like documents 106, as discussed above.

A domain total like count corresponding to a sum of the document total like counts of the indicators may be determined for each corresponding web domain associated with each of the plurality of obtained like documents (208). For example, the domain like total component 136 may determine a domain total like count 138 corresponding to a sum of the document total like counts of the indicators 108 for each corresponding web domain 134 associated with each of the plurality of obtained like documents 106, as discussed above.

A first candidate group of the corresponding web domains may be determined based on a comparison of a predetermined threshold value with one or more of the domain total like counts (210). For example, the first candidate selection component 140 may determine a first candidate group 142 of the corresponding web domains 134 based on a comparison of a predetermined threshold value 144 with one or more of the domain total like counts 138, as discussed above.

A likefarm domain confidence score for each one of a second group of the corresponding web domains may be determined, via a device processor, based on a decision tree function that is based on a plurality of domain attributes (212). For example, the likefarm domain confidence determination component 146 may determine, via the device processor 148, a likefarm domain confidence score 150 for each one of a second group 152 of the corresponding web domains 134 based on a decision tree function 154 that is based on a plurality of domain attributes 156, as discussed above.

According to an example embodiment, the likefarm domain confidence score 150 for each corresponding web domain 134 included in the second group 152 may indicate a confidence level that the corresponding web domain is associated with one or more likefarm entities (214).

According to an example embodiment, the plurality of domain attributes may include one or more of a likefarm classification value indicating an average value over the obtained like documents associated with the each corresponding web domain, a length of time of domain registration associated with each corresponding web domain included in the first candidate group, a total count of like selection objects associated with respective home pages that are associated with each corresponding web domain included in the first candidate group, an indication that a web location associated with the each corresponding web domain included in the first candidate group is included in a list of likefarm blacklist web locations, or an indication that data associated with one or more web pages associated with the each corresponding web domain included in the first candidate group is included in a likefarm blacklist associated with one or more web services (216).

According to an example embodiment, the second group may include the respective corresponding web domains associated with each of the plurality of obtained like documents or the first candidate group (218).

According to an example embodiment, a likefarm classification value associated with each one of the obtained like documents may be determined (220). For example, the machine learning (ML) classifier component 168 may determine a likefarm classification value 158 associated with each one of the obtained like documents 106, as discussed above.

According to an example embodiment, an average value of the determined likefarm classification values may be determined for each corresponding web domain associated with each of the plurality of obtained like documents (222). For example, the domain average score component 170 may determine an average value 172 of the determined likefarm classification values for each corresponding web domain 134 associated with each of the plurality of obtained like documents 106, as discussed above.

According to an example embodiment, a time of domain registration associated with each corresponding web domain included in the first candidate group may be determined (224). For example, the domain registration lookup component 174 may determine a time of domain registration 176 associated with each corresponding web domain 134 included in the first candidate group 142, as discussed above.

According to an example embodiment, a length of time of domain registration associated with each corresponding web domain included in the first candidate group may be determined based on the respective determined time of domain registration (226). For example, the likefarm domain confidence determination component 146 may determine a length of time of domain registration 160 associated with each corresponding web domain 134 included in the first candidate group 142 based on the respective determined time of domain registration 176, as discussed above.

According to an example embodiment, a traversal of respective home pages associated with each corresponding web domain included in the first candidate group, and storage of data associated with the traversed home pages in a crawled data storage area may be initiated (228). For example, the web crawl component 178 may initiate a traversal of respective home pages associated with each corresponding web domain 134 included in the first candidate group 142, and storage of data associated with the traversed home pages 180 in a crawled data storage area 182, as discussed above.

According to an example embodiment, it may be determined whether the data associated with each respective home page associated with each corresponding web domain included in the first candidate group includes data that is included in a likefarm blacklist associated with one or more web services (230). For example, the web service lookup component 184 may determine whether the data associated with each respective home page 180 associated with each corresponding web domain 134 included in the first candidate group 142 includes data that is included in a likefarm blacklist associated with one or more web services, as discussed above.

According to an example embodiment, a total count of like selection objects associated with each respective home page that is associated with each corresponding web domain included in the first candidate group may be determined (232). For example, the like icon count component 186 may determine a total count 162 of like selection objects associated with each respective home page that is associated with each corresponding web domain 134 included in the first candidate group 142, as discussed above.

According to an example embodiment, the like selection objects may include one or more like button icons (234).

According to an example embodiment, a web location associated with each corresponding web domain included in the first candidate group may be determined (236). For example, the web location lookup component 188 may determine a web location 190 associated with each corresponding web domain 134 included in the first candidate group 142, as discussed above.

According to an example embodiment, it may be determined whether the determined web location is included in a list of likefarm blacklist web locations (238). For example, the likefarm domain confidence determination component 146 may determine whether the determined web location 190 is included in a list of likefarm blacklist web locations, as discussed above.

According to an example embodiment, the web location associated with each corresponding web domain included in the first candidate group may include an Internet Protocol (IP) address (240).

According to an example embodiment, the list of likefarm blacklist web locations may include a list of likefarm blacklist IP addresses (242).

Figure 3A:
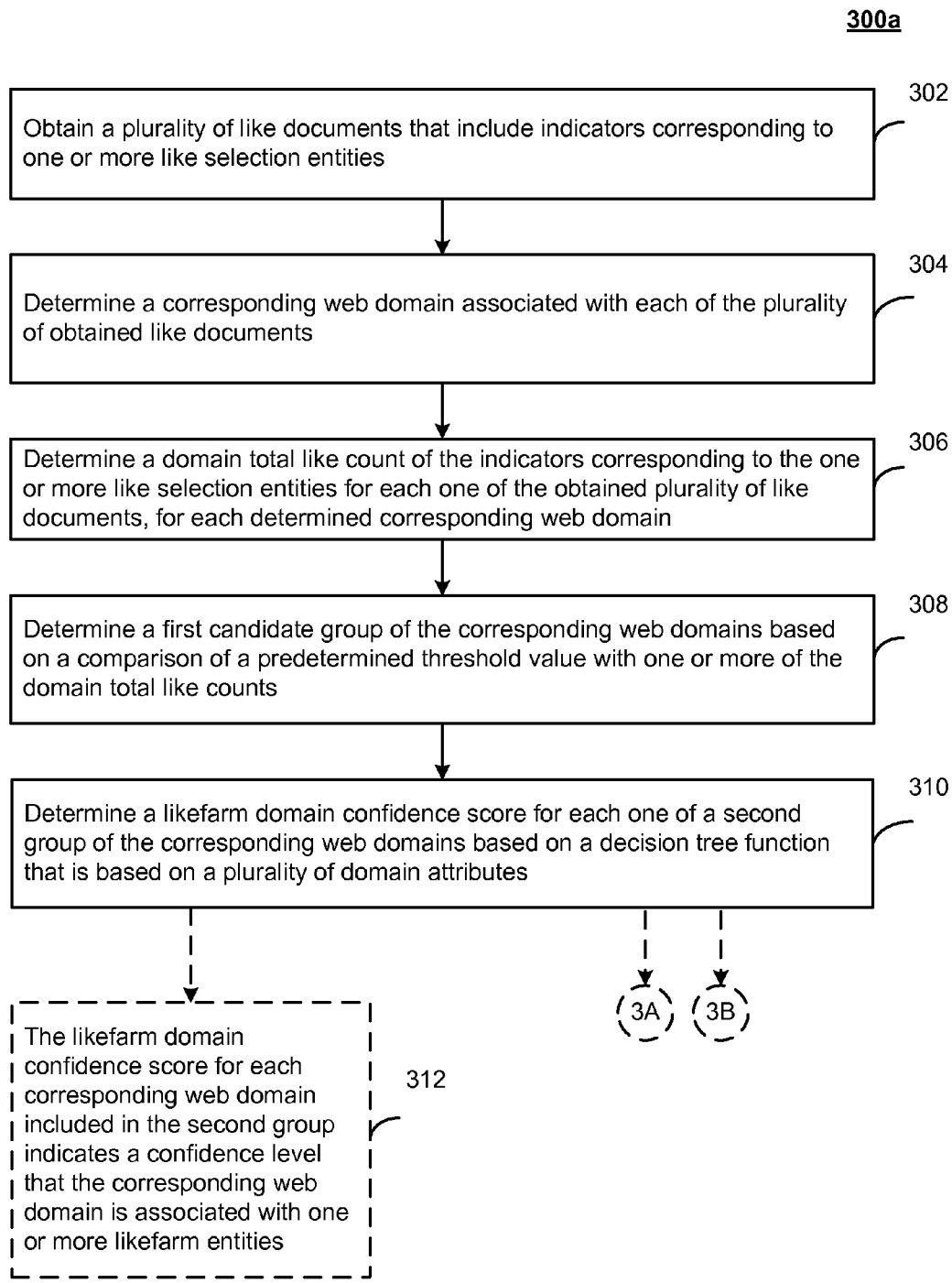
FIG. 3 is a flowchart illustrating example operations of the system of FIG. 1.
Figure 3B:
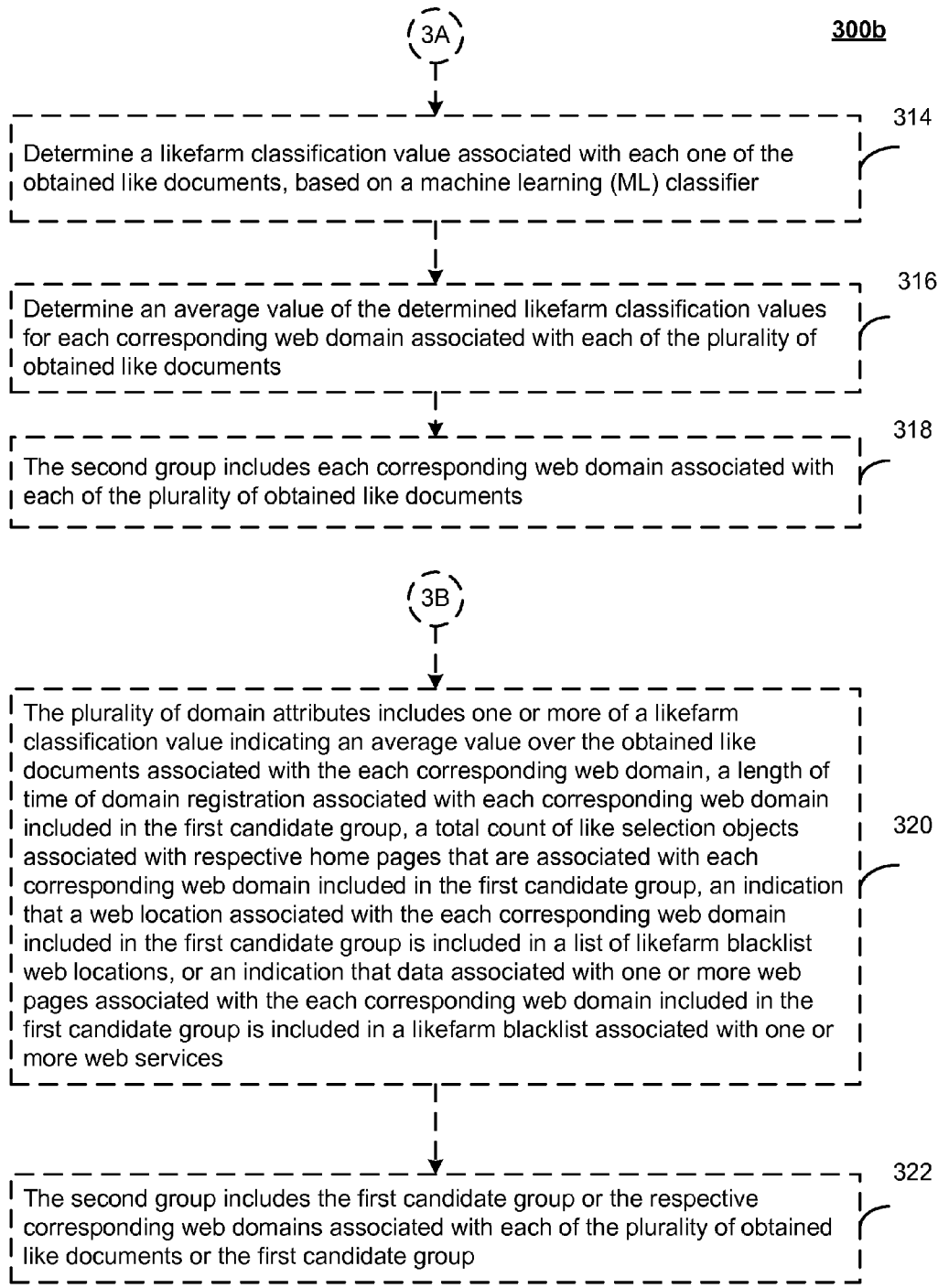

FIG. 3 is a flowchart illustrating example operations of the system of FIG. 1, according to example embodiments. In the example of FIG. 3, a plurality of like documents that include indicators corresponding to one or more like selection entities may be obtained (302). For example, the like document acquisition component 104 may obtain the plurality of like documents 106, as discussed above.

A corresponding web domain associated with each of the plurality of obtained like documents may be determined (304). For example, the domain determination component 132 may determine a corresponding web domain 134 associated with each of the plurality of obtained like documents 106, as discussed above.

A domain total like count of the indicators corresponding to the one or more like selection entities may be determined for each one of the obtained plurality of like documents, for each determined corresponding web domain (306). For example, the domain like total component 136 may determine a domain total like count 138 corresponding to a sum of the document total like counts of the indicators 108 for each corresponding web domain 134 associated with each of the plurality of obtained like documents 106, as discussed above.

A first candidate group of the corresponding web domains may be determined based on a comparison of a predetermined threshold value with one or more of the domain total like counts (308). For example, the first candidate selection component 140 may determine a first candidate group 142 of the corresponding web domains 134 based on a comparison of a predetermined threshold value 144 with one or more of the domain total like counts 138, as discussed above.

A likefarm domain confidence score may be determined for each one of a second group of the corresponding web domains based on a decision tree function that is based on a plurality of domain attributes (310). For example, the likefarm domain confidence determination component 146 may determine the likefarm domain confidence score 150 for each one of a second group 152 of the corresponding web domains 134 based on a decision tree function 154 that is based on a plurality of domain attributes 156, as discussed above.

According to an example embodiment, the likefarm domain confidence score 150 for each corresponding web domain 134 included in the second group 152 may indicate a confidence level that the corresponding web domain 134 is associated with one or more likefarm entities (312).

According to an example embodiment, a likefarm classification value associated with each one of the obtained like documents may be determined, based on a machine learning (ML) classifier (314). For example, the machine learning (ML) classifier component 168 may determine a likefarm classification value 158 associated with each one of the obtained like documents 106, as discussed above.

According to an example embodiment, an average value of the determined likefarm classification values may be determined for each corresponding web domain associated with each of the plurality of obtained like documents (316). For example, the domain average score component 170 may determine an average value 172 of the determined likefarm classification values for each corresponding web domain 134 associated with each of the plurality of obtained like documents 106, as discussed above.

According to an example embodiment, the second group may include each corresponding web domain associated with each of the plurality of obtained like documents (318).

According to an example embodiment, the plurality of domain attributes may include one or more of a likefarm classification value indicating an average value over the obtained like documents associated with the each corresponding web domain, a length of time of domain registration associated with each corresponding web domain included in the first candidate group, a total count of like selection objects associated with respective home pages that are associated with each corresponding web domain included in the first candidate group, an indication that a web location associated with the each corresponding web domain included in the first candidate group is included in a list of likefarm blacklist web locations, or an indication that data associated with one or more web pages associated with the each corresponding web domain included in the first candidate group is included in a likefarm blacklist associated with one or more web services (320).

According to an example embodiment, the second group may include the first candidate group or the respective corresponding web domains associated with each of the plurality of obtained like documents or the first candidate group (322).

Figure 4A:
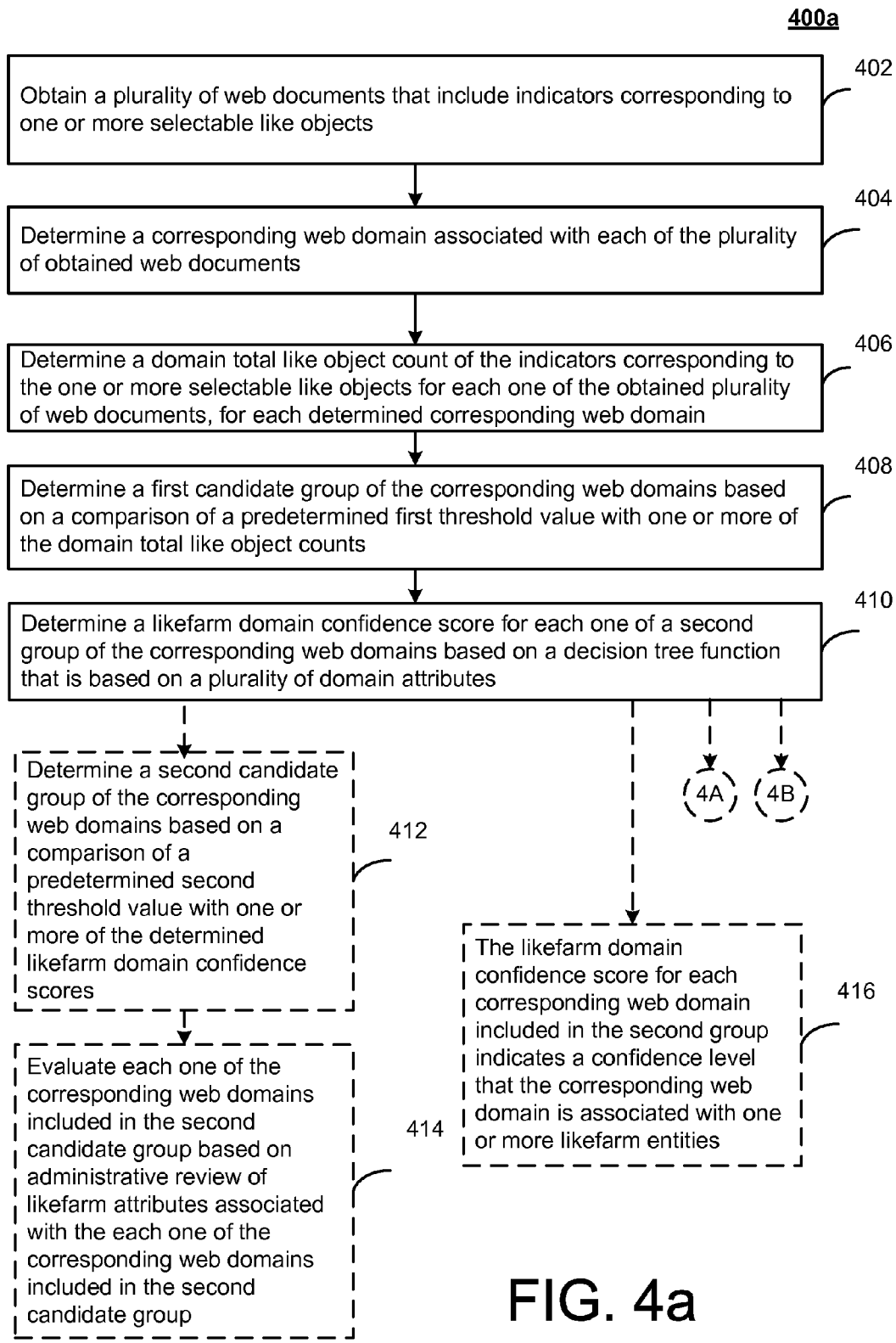
FIG. 4 is a flowchart illustrating example operations of the system of FIG. 1.
Figure 4B:
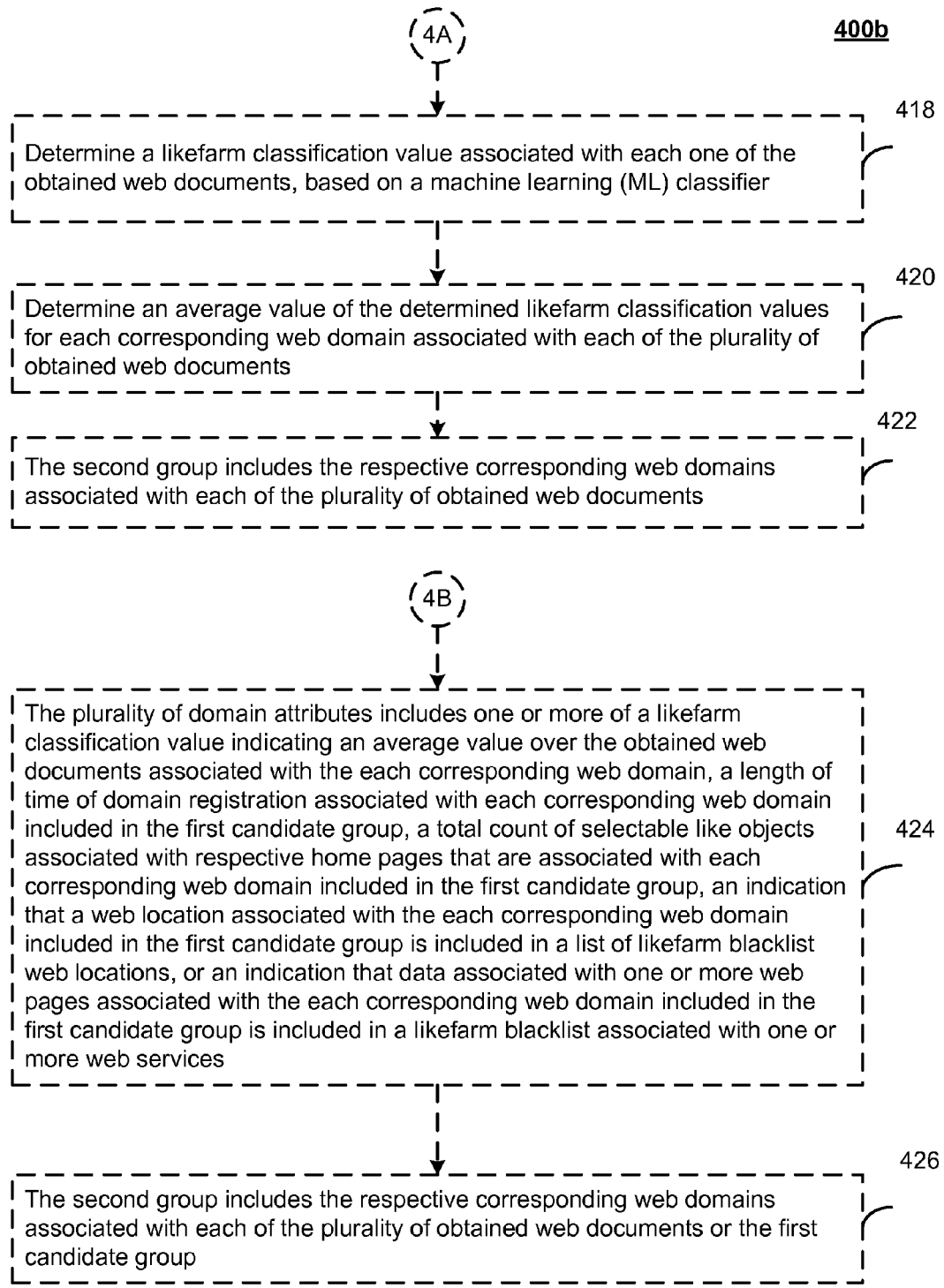

FIG. 4 is a flowchart illustrating example operations of the system of FIG. 1, according to example embodiments. In the example of FIG. 4a, a plurality of web documents that include indicators corresponding to one or more selectable like objects may be obtained (402). For example, the like document acquisition component 104 may obtain the plurality of like documents 106 that include indicators 108 corresponding to one or more like selection objects, as discussed above.

A corresponding web domain associated with each of the plurality of obtained web documents may be determined (404). For example, the domain determination component 132 may determine a corresponding web domain 134 associated with each of the plurality of obtained like documents 106, as discussed above.

A domain total like object count of the indicators corresponding to the one or more selectable like objects may be determined for each one of the obtained plurality of web documents, for each determined corresponding web domain (406). For example, the domain like total component 136 may determine a domain total like count 138 corresponding to a sum of the document total like counts of the indicators 108 for each corresponding web domain 134 associated with each of the plurality of obtained like documents 106, as discussed above.

A first candidate group of the corresponding web domains may be determined based on a comparison of a predetermined first threshold value with one or more of the domain total like object counts (408). For example, the first candidate selection component 140 may determine a first candidate group 142 of the corresponding web domains 134 based on a comparison of a predetermined threshold value 144 with one or more of the domain total like counts 138, as discussed above.

A likefarm domain confidence score may be determined, via a device processor, for each one of a second group of the corresponding web domains based on a decision tree function that is based on a plurality of domain attributes (410). For example, the likefarm domain confidence determination component 146 may determine, via the device processor 148, a likefarm domain confidence score 150 for each one of a second group 152 of the corresponding web domains 134 based on the decision tree function 154 that is based on a plurality of domain attributes 156, as discussed above.

According to an example embodiment, a second candidate group of the corresponding web domains 134 may be determined based on a comparison of a predetermined second threshold value with one or more of the determined likefarm domain confidence scores 150 (412).

According to an example embodiment, each one of the corresponding web domains included in the second candidate group may be evaluated based on administrative review of likefarm attributes associated with the each one of the corresponding web domains included in the second candidate group (414).

According to an example embodiment, the likefarm domain confidence score 150 for each corresponding web domain 134 included in the second group 152 may indicate a confidence level that the corresponding web domain 134 is associated with one or more likefarm entities (416).

According to an example embodiment, a likefarm classification value associated with each one of the obtained web documents may be determined, based on a machine learning (ML) classifier (418). For example, the machine learning (ML) classifier component 168 may determine a likefarm classification value 158 associated with each one of the obtained like documents 106, as discussed above.

According to an example embodiment, an average value of the determined likefarm classification values may be determined for each corresponding web domain associated with each of the plurality of obtained web documents (420). For example, the domain average score component 170 may determine an average value 172 of the determined likefarm classification values for each corresponding web domain 134 associated with each of the plurality of obtained like documents 106, as discussed above.

According to an example embodiment, the second group 152 may include the respective corresponding web domains 134 associated with each of the plurality of obtained web documents (e.g., the like documents 106) (422).

According to an example embodiment, the plurality of domain attributes may include one or more of a likefarm classification value indicating an average value over the obtained web documents associated with the each corresponding web domain, a length of time of domain registration associated with each corresponding web domain included in the first candidate group, a total count of selectable like objects associated with respective home pages that are associated with each corresponding web domain included in the first candidate group, an indication that a web location associated with the each corresponding web domain included in the first candidate group is included in a list of likefarm blacklist web locations, or an indication that data associated with one or more web pages associated with the each corresponding web domain included in the first candidate group is included in a likefarm blacklist associated with one or more web services (424).

According to an example embodiment, the second group may include the respective corresponding web domains associated with each of the plurality of obtained web documents or the first candidate group (426).

Figure 5:
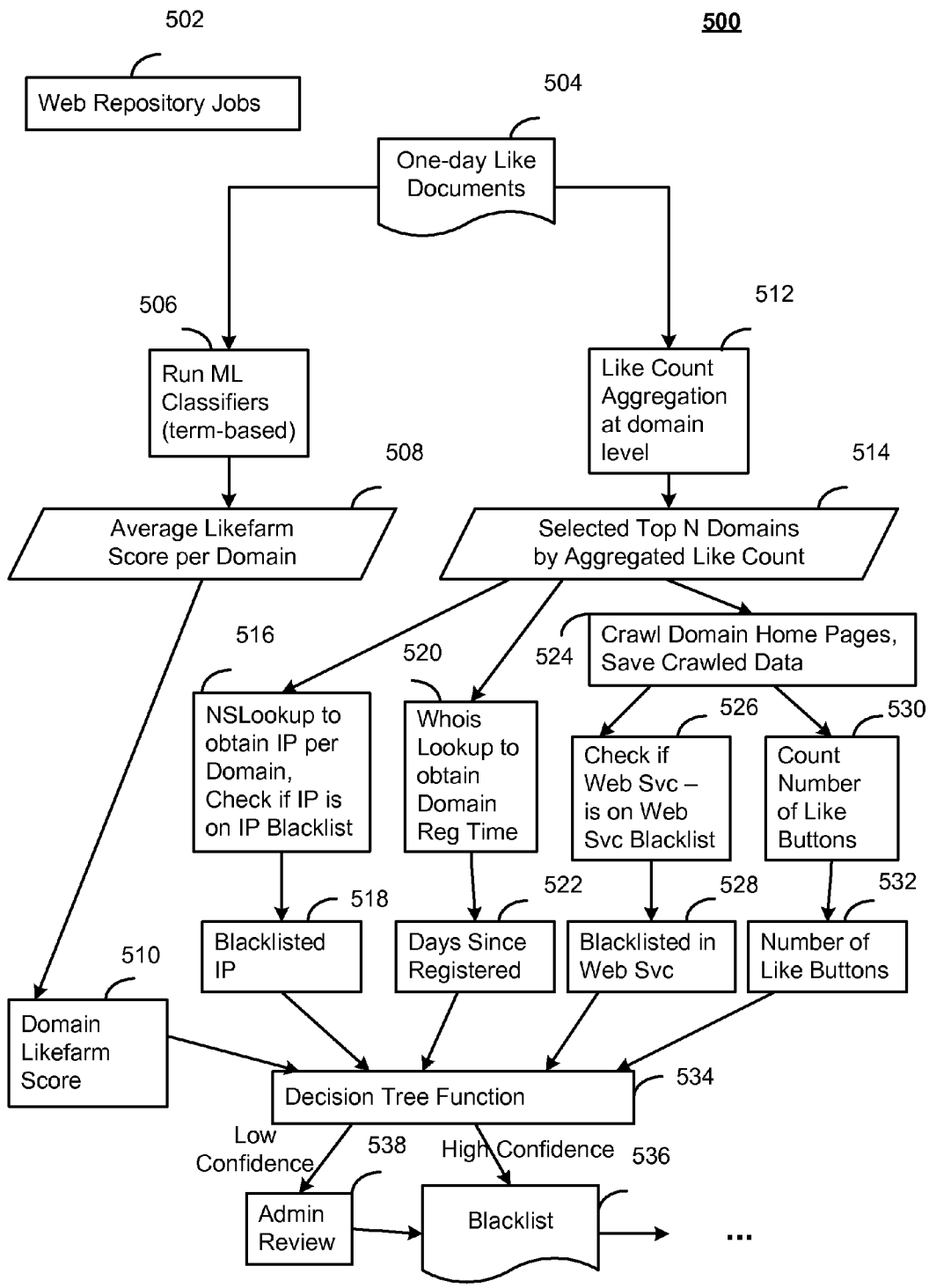
FIG. 5 is a block diagram of an example system for likefarm determination.

FIG. 5 is a block diagram of an example system 500 for likefarm determination. As shown in FIG. 5, a web crawler service may periodically crawl the web, for example, via web repository jobs 502, to obtain and store data discovered via traversal of various web sites. For example, based on such stored data, a plurality of web documents that may include icons or other selectable objects for selection of one or more like attributes, may be obtained. For example, based on retrieval over one day, a collection of one-day like documents 504 may be obtained. For example, the like document acquisition component 104 may obtain a plurality of like documents 106 that include indicators 108 corresponding to one or more like selection objects, as discussed above.

As shown in FIG. 5, one or more machine learning (ML) classifiers may be run (506) on the one-day like documents 504, to obtain an average likefarm score per domain 508. For example, the machine learning (ML) classifier component 168 may determine a likefarm classification value 158 associated with each one of the obtained like documents 106. For example, the ML classifier component 168 may generate a score in [0,1]. For example, the ML classifier component 168 may include a logistic regression model that may be trained based on approximately twenty features with 20K documents. For example, if one of the like documents 106 is associated with a score less than 0.5, it may be not considered as a likefarm candidate.

For example, the domain average score component 170 may determine an average value 172 of the determined likefarm classification values for each corresponding web domain 134 associated with each of the plurality of obtained like documents 106, as discussed above.

A domain likefarm score 510 may thus be obtained.

As shown in FIG. 5, like counts may be aggregated at the domain level (512) (e.g., like counts per domain, for one day of obtained data). For example, the domain like total component 136 may determine a domain total like count 138 corresponding to a sum of the document total like counts of the indicators 108 for each corresponding web domain 134 associated with each of the plurality of obtained like documents 106, as discussed above. Based on the aggregated like counts, the top N domains may be selected (514) for further processing to determine domains associated with likefarm entities. For example, the first candidate selection component 140 may determine a first candidate group 142 of the corresponding web domains 134 based on a comparison of a predetermined threshold value 144 with one or more of the domain total like counts 138, as discussed above. For example, N (e.g., the predetermined threshold value 144) may be determined based on a cut-off point, based on a density distribution A lookup may be performed to determine a web location associated with a domain (516), and it may be determined whether the web location is included in a web location blacklist (518). For example, the web location lookup component 188 may determine a web location 190 associated with each corresponding web domain 134 included in the first candidate group 142. For example, an NSLOOKUP may be performed to determine the web location 190 (e.g., an Internet Protocol (IP) address). For example, the likefarm domain confidence determination component 146 may determine whether the determined web location 190 is included in a list of likefarm blacklist web locations, as discussed above. For example, IP addresses may be analyzed based on likefarm black list domains maintained by various sources.

A lookup may be performed to determine a time (e.g., a date) of domain name registration associated with a domain (520), and a length of time registered (e.g., a number of days) may be determined (522). For example, a WHOIS lookup may be performed to determine the date of a domain registration. For example, the domain registration lookup component 174 may determine a time of domain registration 176 associated with each corresponding web domain 134 included in the first candidate group 142, as discussed above. For example, domain information that has already been looked up may be stored (e.g., in the entity repository 110), to avoid potential duplications of lookups of domains.

For example, the likefarm domain confidence determination component 146 may determine a length of time of domain registration 160 associated with each corresponding web domain 134 included in the first candidate group 142 based on the respective determined time of domain registration 176, as discussed above.

As shown in FIG. 5, home pages associated with the selected domains may be crawled, and the crawled data may be saved (524). For example, the web crawl component 178 may initiate a traversal of respective home pages associated with each corresponding web domain 134 included in the first candidate group 142, and storage of data associated with the traversed home pages 180 in a crawled data storage area 182, as discussed above. For example, GNU WGET may be used to obtain HyperText Markup Language (HTML) content and extract desired information. For example, the crawled contents may be stored incrementally. For example, the domains may be crawled and the associated information stored, to avoid crawling same domains more than once.

It may be determined whether data associated with each respective home page is included in one or more web services likefarm blacklists (526, 528). For example, it may be determined whether an identification (ID) associated with an advertising service (e.g., GOOGLE ADSENSE) may be included in one or more likefarm blacklists associated with the advertising service. For example, the web service lookup component 184 may determine whether the data associated with each respective home page 180 associated with each corresponding web domain 134 included in the first candidate group 142 includes data (e.g., an ADSENSE ID) that is included in a likefarm blacklist associated with one or more web services, as discussed above. For example, a likefarm blacklist may include black IDs associated with GOOGLE ADSENSE (e.g., GOOGLE ADSENSE IDs used by spammers, which have been previously detected and included in the likefarm blacklist). For this example, GOOGLE ADSENSE IDs may be extracted from home pages of sits, and may be looked up in the likefarm blacklist. A match may provide a strong indication that the domain is associated with a likefarm.

The data associated with each respective home page may be analyzed to determine like selection objects, and the determined like selection objects may be tallied (530), to obtain a count of the number of determined like selection objects 532 (e.g., a count of the number of like buttons included in the data associated with each respective home page). For example, the like icon count component 186 may determine a total count 162 of like selection objects associated with each respective home page that is associated with each corresponding web domain 134 included in the first candidate group 142, as discussed above. For example, if a large number of determined like selection objects 532 may indicate that the corresponding web domain 134 is associated with a likefarm entity.

As shown in FIG. 5, a decision tree function 534 may process the domain likefarm score 510, an indication of a blacklisted web address 518, the length of time of domain registration 522, an indication of a domain blacklisted by a web service 528, and the number of like selection objects 532. For example, the likefarm domain confidence determination component 146 may determine, via the device processor 148, a likefarm domain confidence score 150 for each one of a second group 152 of the corresponding web domains 134 based on a decision tree function 154 that is based on a plurality of domain attributes 156, as discussed above. For example, the plurality of domain attributes 156 may include one or more of a likefarm classification value 158 indicating an average value over the obtained like documents 106 associated with the each corresponding web domain 134, a length of time of domain registration 160 associated with each corresponding web domain 134 included in the first candidate group 142, a total count 162 of like selection objects associated with respective home pages that are associated with each corresponding web domain 134 included in the first candidate group 142, an indication that a web location associated with the each corresponding web domain included in the first candidate group is included in a list of likefarm blacklist web locations 164, or an indication that data associated with one or more web pages associated with the each corresponding web domain included in the first candidate group is included in a likefarm blacklist associated with one or more web services 166, as discussed above.

As shown in FIG. 5, if the decision tree function 534 determines that a domain may be associated with a likefarm entity with a high level of confidence, then the domain may be included in a system blacklist 536, for further processing and analysis. If the decision tree function 534 determines that a domain may be associated with a likefarm entity with a low level of confidence, then the domain may be further analyzed via administrative review 538. For example, an administrator may include the domain in the system blacklist 536, for further processing and analysis.

Example techniques discussed herein may thus make determinations of domains associated with likefarms.

Customer privacy and confidentiality have been ongoing considerations in data processing environments for many years. Thus, example techniques for determining likefarms may use data provided by users who have provided permission via one or more subscription agreements (e.g., "Terms of Service" (TOS) agreements) with associated applications or services associated with the determination of likefarms.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program (s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a like document acquisition component that obtains a plurality of like documents that include indicators corresponding to one or more like selection objects;
   a document like total component that determines a document total like count of the indicators corresponding to the one or more like selection objects for each one of the plurality of like documents, the total like count of the indicators for the each one of the plurality of like documents determined as a tallied number of the indicators for the each one of the plurality of like documents;
   a domain determination component that determines a corresponding web domain associated with each of the plurality of obtained like documents;
   a domain like total component that determines a domain total like count corresponding to a sum of the document total like counts of the indicators for each corresponding web domain associated with each of the plurality of obtained like documents;
   a first candidate selection component that determines a first candidate group of the corresponding web domains based on a comparison of a predetermined threshold value with one or more of the domain total like counts; and
   a likefarm domain confidence determination component that determines, via a device processor, a likefarm domain confidence score for each one of a second group of the corresponding web domains based on a decision tree function that is based on a plurality of domain attributes.

2. The system of claim 1, wherein:
the likefarm domain confidence score for each corresponding web domain included in the second group indicates a confidence level that the corresponding web domain is associated with one or more likefarm entities.

3. The system of claim 1, wherein:
the plurality of domain attributes includes one or more of:
a likefarm classification value indicating an average value over the obtained like documents associated with the each corresponding web domain,
a length of time of domain registration associated with each corresponding web domain included in the first candidate group,
a total count of like selection objects associated with respective home pages that are associated with each corresponding web domain included in the first candidate group,
an indication that a web location associated with the each corresponding web domain included in the first candidate group is included in a list of likefarm blacklist web locations, or
an indication that data associated with one or more web pages associated with the each corresponding web domain included in the first candidate group is included in a likefarm blacklist associated with one or more web services, wherein
the second group includes the respective corresponding web domains associated with each of the plurality of obtained like documents or the first candidate group.

4. The system of claim 1, further comprising:
a machine learning (ML) classifier component that determines a likefarm classification value associated with each one of the obtained like documents; and
a domain average score component that determines an average value of the determined likefarm classification values for each corresponding web domain associated with each of the plurality of obtained like documents.

5. The system of claim 1, wherein:
the likefarm domain confidence determination component includes a domain registration lookup component that determines a time of domain registration associated with each corresponding web domain included in the first candidate group, wherein the likefarm domain confidence determination component determines a length of time of domain registration associated with each corresponding web domain included in the first candidate group based on the respective determined time of domain registration.

6. The system of claim 1, wherein:
the likefarm domain confidence determination component includes a web crawl component that initiates a traversal of respective home pages associated with each corresponding web domain included in the first candidate group, and storage of data associated with the traversed home pages in a crawled data storage area.

7. The system of claim 6, wherein:
the likefarm domain confidence determination component includes a web service lookup component that determines whether the data associated with each respective home page associated with each corresponding web domain included in the first candidate group includes data that is included in a likefarm blacklist associated with one or more web services.

8. The system of claim 6, wherein:
the likefarm domain confidence determination component includes a like icon count component that determines a total count of like selection objects associated with each respective home page that is associated with each corresponding web domain included in the first candidate group.

9. The system of claim 8, wherein:
the like selection objects include one or more like button icons.

10. The system of claim 1, wherein:
the likefarm domain confidence determination component includes a web location lookup component that determines a web location associated with each corresponding web domain included in the first candidate group, wherein
the likefarm domain confidence determination component determines whether the determined web location is included in a list of likefarm blacklist web locations.

11. The system of claim 10, wherein:
the web location associated with each corresponding web domain included in the first candidate group includes an Internet Protocol (IP) address, and
the list of likefarm blacklist web locations includes a list of likefarm blacklist IP addresses.

12. A computer program product tangibly embodied on a machine readable storage device and including executable code that causes at least one data processing apparatus to:
obtain a plurality of like documents that include indicators corresponding to one or more like selection entities;
determine a corresponding web domain associated with each of the plurality of obtained like documents;
determine a domain total like count of the indicators corresponding to the one or more like selection entities for each one of the obtained plurality of like documents, for each determined corresponding web domain, the domain total like count of the indicators determined as a domain total tallied number of the indicators for the each one of the plurality of like documents, for each determined corresponding web domain;
determine a first candidate group of the corresponding web domains based on a comparison of a predetermined threshold value with one or more of the domain total like counts; and
determine a likefarm domain confidence score for each one of a second group of the corresponding web domains based on a decision tree function that is based on a plurality of domain attributes.

13. The computer program product of claim 12, wherein:
the likefarm domain confidence score for each corresponding web domain included in the second group indicates a confidence level that the corresponding web domain is associated with one or more likefarm entities.

14. The computer program product of claim 12, wherein the executable code is configured to cause the at least one data processing apparatus to:
determine a likefarm classification value associated with each one of the obtained like documents, based on a machine learning (ML) classifier; and
determine an average value of the determined likefarm classification values for each corresponding web domain associated with each of the plurality of obtained like documents,
wherein the second group includes each corresponding web domain associated with each of the plurality of obtained like documents.

15. The computer program product of claim 12, wherein the plurality of domain attributes includes one or more of:
a likefarm classification value indicating an average value over the obtained like documents associated with the each corresponding web domain,
a length of time of domain registration associated with each corresponding web domain included in the first candidate group,
a total count of like selection objects associated with respective home pages that are associated with each corresponding web domain included in the first candidate group,
an indication that a web location associated with the each corresponding web domain included in the first candidate group is included in a list of likefarm blacklist web locations, or
an indication that data associated with one or more web pages associated with the each corresponding web domain included in the first candidate group is included in a likefarm blacklist associated with one or more web services, wherein
the second group includes the first candidate group or the respective corresponding web domains associated with each of the plurality of obtained like documents or the first candidate group.

16. A method comprising:
obtaining a plurality of web documents that include indicators corresponding to one or more selectable like objects;
determining a corresponding web domain associated with each of the plurality of obtained web documents;
determining a domain total like object count of the indicators corresponding to the one or more selectable like objects for each one of the obtained plurality of web documents, for each determined corresponding web domain, the domain total like object count of the indicators determined as a domain total tallied number of the indicators for the each one of the obtained plurality of like documents, for each determined corresponding web domain;
determining a first candidate group of the corresponding web domains based on a comparison of a predetermined first threshold value with one or more of the domain total like object counts; and
determining, via a device processor, a likefarm domain confidence score for each one of a second group of the corresponding web domains based on a decision tree function that is based on a plurality of domain attributes.

17. The method of claim 16, further comprising:
determining a second candidate group of the corresponding web domains based on a comparison of a predetermined second threshold value with one or more of the determined likefarm domain confidence scores; and
evaluating each one of the corresponding web domains included in the second candidate group based on administrative review of likefarm attributes associated with the each one of the corresponding web domains included in the second candidate group.

18. The method of claim 16, wherein:
the likefarm domain confidence score for each corresponding web domain included in the second group indicates a confidence level that the corresponding web domain is associated with one or more likefarm entities.

19. The method of claim 16, further comprising:
determining a likefarm classification value associated with each one of the obtained web documents, based on a machine learning (ML) classifier; and
determining an average value of the determined likefarm classification values for each corresponding web domain associated with each of the plurality of obtained web documents, wherein
the second group includes the respective corresponding web domains associated with each of the plurality of obtained web documents.

20. The method of claim 16, wherein the plurality of domain attributes includes one or more of:
a likefarm classification value indicating an average value over the obtained web documents associated with the each corresponding web domain, a length of time of domain registration associated with each corresponding web domain included in the first candidate group, a total count of selectable like objects associated with respective home pages that are associated with each corresponding web domain included in the first candidate group, an indication that a web location associated with the each corresponding web domain included in the first candidate group is included in a list of likefarm blacklist web locations, or an indication that data associated with one or more web pages associated with the each corresponding web domain included in the first candidate group is included in a likefarm blacklist associated with one or more web services, wherein the second group includes the respective corresponding web domains associated with each of the plurality of obtained web documents or the first candidate group.

* * * * *